United States Patent [19]

Norman

[11] Patent Number: 5,226,703
[45] Date of Patent: Jul. 13, 1993

[54] IDLER ROLLER MOUNTING/SCRAPER FOR TRACK VEHICLE

[75] Inventor: Donald E. Norman, Lexington, Ky.

[73] Assignees: Link-Belt Construction Co., Lexington, Ky.; Sumitomo Construction Machinery, Japan; part interest

[21] Appl. No.: 870,996

[22] Filed: Apr. 20, 1992

[51] Int. Cl.$^5$ .............................................. B60S 1/62
[52] U.S. Cl. ........................................ 305/12; 305/11
[58] Field of Search ...................... 305/11, 12, 13, 21, 305/24, 23, 25, 27, 28, 56, 57; 280/855

[56] References Cited

U.S. PATENT DOCUMENTS

| | | | |
|---|---|---|---|
| 2,560,307 | 7/1951 | Slemmons | 305/12 |
| 3,976,337 | 8/1976 | Vaughn | 305/12 |
| 4,198,103 | 4/1980 | Ward et al. | 305/12 |
| 4,265,494 | 5/1981 | Matsubara et al. | 305/12 |
| 4,531,787 | 7/1985 | Hart et al. | 305/12 |
| 4,830,439 | 5/1989 | Collins et al. | 305/11 |

FOREIGN PATENT DOCUMENTS 263161  4/1927  United Kingdom ................. 305/12

Primary Examiner—Russell D. Stormer
Attorney, Agent, or Firm—King and Schickli

[57] ABSTRACT

A mounting bracket is provided for the support or idler rollers for the upper run of a track vehicle. The bracket includes two sets of teeth on opposite sides of the roller in order to scrape and remove mud and debris. Preferably, the bracket includes mounting wings that extend downwardly at an approximately 45-degree angle and with the teeth extending substantially tangentially to the outer support surface of the roller. The roller extends down into a cut-out opening between the wings and the teeth that are formed integrally along the upper edges of the wings. Flat bridge portions of the plate receive the bearing pillow blocks of the roller.

11 Claims, 2 Drawing Sheets

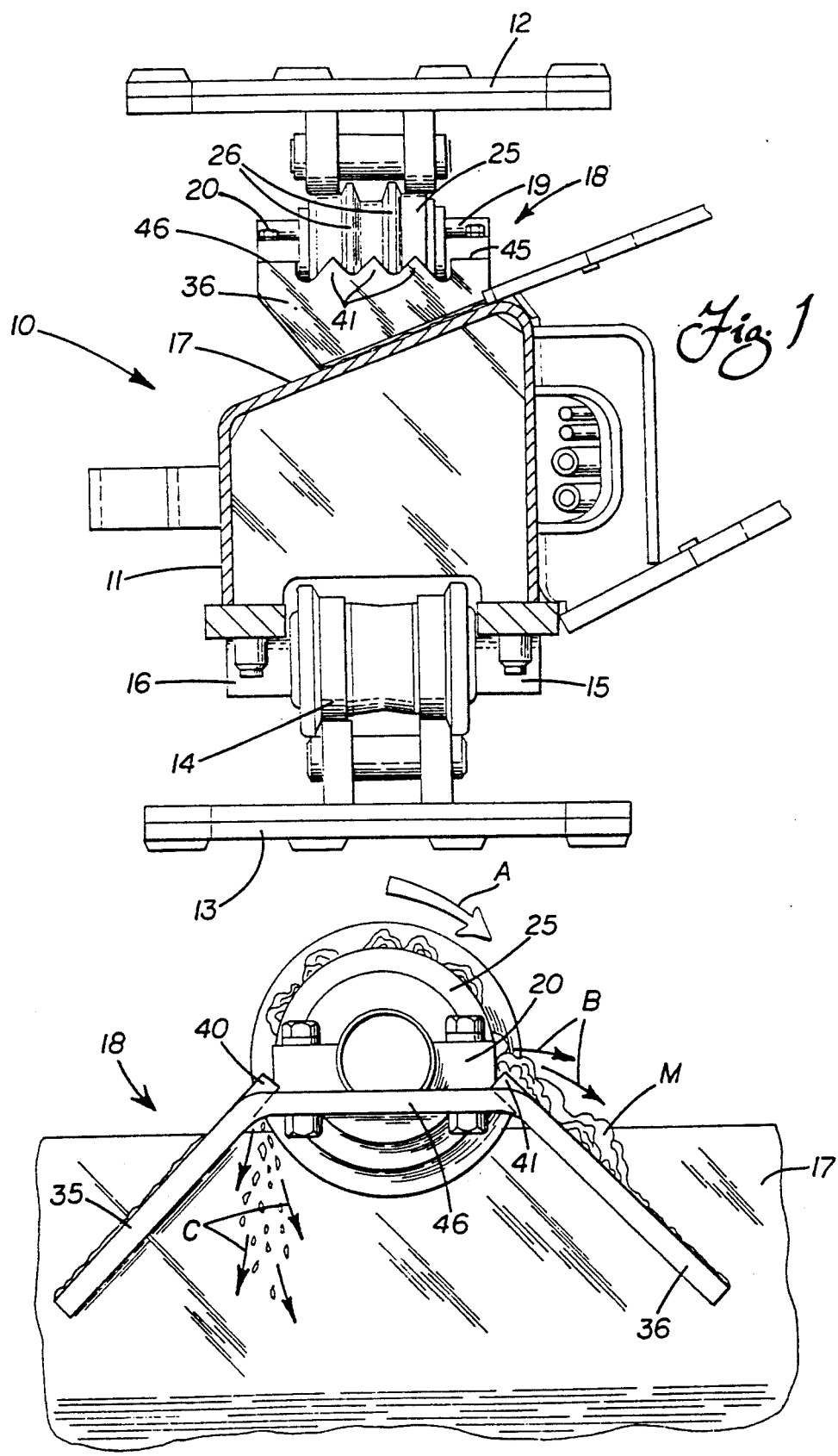

IDLER ROLLER MOUNTING/SCRAPER FOR TRACK VEHICLE

TECHNICAL FIELD

The present invention relates generally to track or crawler-type vehicle component and, more particularly, to a mounting bracket for a roller for supporting or carrying the track in an improved manner.

BACKGROUND OF THE INVENTION

Heavy duty, off-the-road vehicles and equipment utilize endless tracks to provide better mobility on uneven ground and for improved traction in mud. The tracks comprise a plurality of links formed together in an endless chain-type fashion with pads formed on the links for engagement with the ground. The multiple pads along the lower run of the endless track in engagement with the ground at any one time provide the exceptional traction; the upper run serving to recirculate the track. Sprockets forming the ends of the endless path are driven to provide movement to the vehicle.

The modern-type track vehicle includes a pair of inverted U-shaped frame members extending along the sides of the vehicle and positioned between the upper and lower runs of the track. These frame members tend to aggravate the well-known problem of collection of mud and other debris under the support or idler rollers that carry the endless track along the upper run. The mud not only collects under the rollers against the side frame, but also above the roller and against the track. When working in deep mud on a construction site, which is a majority of the time, the mud/debris collects so as to completely enclose the support rollers. While these rollers are idlers, that is, not driven, it is important that they remain free for rotation to provide efficient movement of the vehicle. If the rollers are stalled by the mud, or for any other reason, the track is caused to slide across the top of the roller. Not only is the driving efficiency of the vehicle reduced, but eventually there are formed flat spots on the top of the roller due to frictional wear. These flat spots render the roller useless and it must be replaced, causing unnecessary expense and downtime of the vehicle.

The packing of the mud and debris around the support rollers is particularly troublesome in clay-type soil. In the past, where the rollers are mounted by the cantilever brackets extending outwardly from the side frame, the mud/debris substantially fully surrounds the roller and prevents, or seriously limits, their free rotation. Freezing weather does, of course, worsen the problem because the moisture in the mud freezes, and totally locks up the rollers. Either the vehicle is left out of service or it is operated with the rollers locked so that flat spotting occurs on the top of the roller, and eventually necessitating replacement.

As a stopgap measure, some equipment owners and contractors have been known to cut holes in the frame of the vehicle in an attempt to relieve the packing of the mud by providing an egress path from the roller. At best, this approach is marginally successful and, of course, the frame of the vehicle ends up being mutilated, so as to not only be unsightly, but significantly reduced in its strength. With this type of alteration, the original equipment manufacturer does not honor any warranty on the vehicle. The rough-cut holes tend to set up stress focal points, causing the frame to crack, and this eventually can lead to complete structural failure. Even if only partial failure results, this is likely to cause the support rollers for the track to become misaligned, or cause other critical components to be shifted out of line, thus causing inefficient operation.

Also, a strengthening of the mounting bracket is a desirable objective. While the cantilevered-type bracket of the prior art works reasonably well when the equipment is clean and out of the mud, there can be other factors, such as lodging of a boulder between the roller and the track or the frame, that can bend and misalign the cantilever supporting shaft. It is better to have the support rollers mounted securely at both ends. It is also a desirable feature to minimize the cost of this portion of the vehicle, while at the same time strengthening the mounting for the support rollers. Accordingly, there is clearly a need for redesign of the support roller mounting and to do so in a manner in which the build-up of mud and debris can be prevented.

SUMMARY OF THE INVENTION

It is accordingly a primary object of the present invention to provide an idler roller mounting bracket that overcomes the shortcomings of the prior art and, in particular, includes a built-in scraper.

It is another object of the present invention to provide a mounting bracket for a track support roller, wherein the roller is securely mounted at both ends, and with the bracket extending from a relatively wide base on the frame of the vehicle, and having an integral scraper so as to efficiently remove mud and debris as the roller rotates, and thereby minimize maintenance of the vehicle.

It is still another object of the present invention to provide a mounting bracket that is fabricated from a single steel plate with a plurality of teeth formed within an opening in the plate to provide scraping along the top, as well as the bottom, of the roller.

Still another object of the present invention is to provide a mounting bracket for a support roller for a track or crawler-type vehicle, wherein integral wings of the bracket extend downwardly at an angle and with the scraper being formed along the sides of an opening in the center of the plate so as to allow scraping of mud/debris from the top of the roller, as well as residual or secondary scraping along the bottom of the roller.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the stated purposes of the present invention as described herein, a mounting bracket for supporting a roller, such as an idler roller along the upper run of a track in a track or crawler-type vehicle is provided. The bracket includes a fabricated plate of approximately three-quarter inch thick mild steel with a center opening for mounting of the roller and integral scrapers extending along the sides of the bracket. As the roller rotates, mud and debris are efficiently removed so as to assure continued rotation and prevent sliding engagement of the track with the top of the roller that can lead to deleterious flat spotting of the roller.

The scraper means preferably includes a plurality or set of teeth formed along two sides of the bracket and defining the central opening for receiving the track support roller. The teeth extend between and on both sides of annular guide ribs on the roller in order to efficiently clear the mud/debris at all times a the roller rotates relative to the bracket.

The plate forming the bracket includes dual depending support wings extending from spaced bridge portions receiving the pillow blocks for the roller, thus providing a straddle mounting for the roller, with the roller extending down into the opening in the plate. The preferred angle of dependency to the wings is approximately 45 degrees. Also, preferably, the scraper means is formed by integral sharpened teeth along the top of the wings. The wings are mounted so as to extend substantially tangentially to the outer support surface of the roller.

With the scraper being positioned along both sides of the roller, there are two sets of teeth extending into juxtaposition with the outer support surface. This means that the mud/debris can be removed as a roller rotates for either forward or backing movement. Furthermore, while the primary scraping occurs along the top of the roller by one set of teeth, there is a secondary scraping action along the bottom of the roller by the other set of teeth. The mud/debris removed from the top of the roller slides down the adjacent wing of the bracket and off of the upper sloping section of the side frame of the vehicle. Advantageously, any remnants of the mud or the like that may be left hanging from the roller and removed by secondary scraping is allowed to egress along the open area under the bracket and also slide down the upper sloping section of the side frame.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawing incorporated in and forming a part of the specification, illustrates several aspects of the present invention and together with the description serves to explain the principles of the invention. In the drawing:

FIG. 1 is a cross-sectional view with parts broken away and taken in a vertical plane along the side frame member of the vehicle, and showing both the upper and lower runs of the track;

FIG. 2 is a side view of the idler roller mounted on the novel bracket of the present invention and showing the removal of mud/debris from the top of the roller during rotation and secondary removal from the bottom of the roller;

Figure 3:
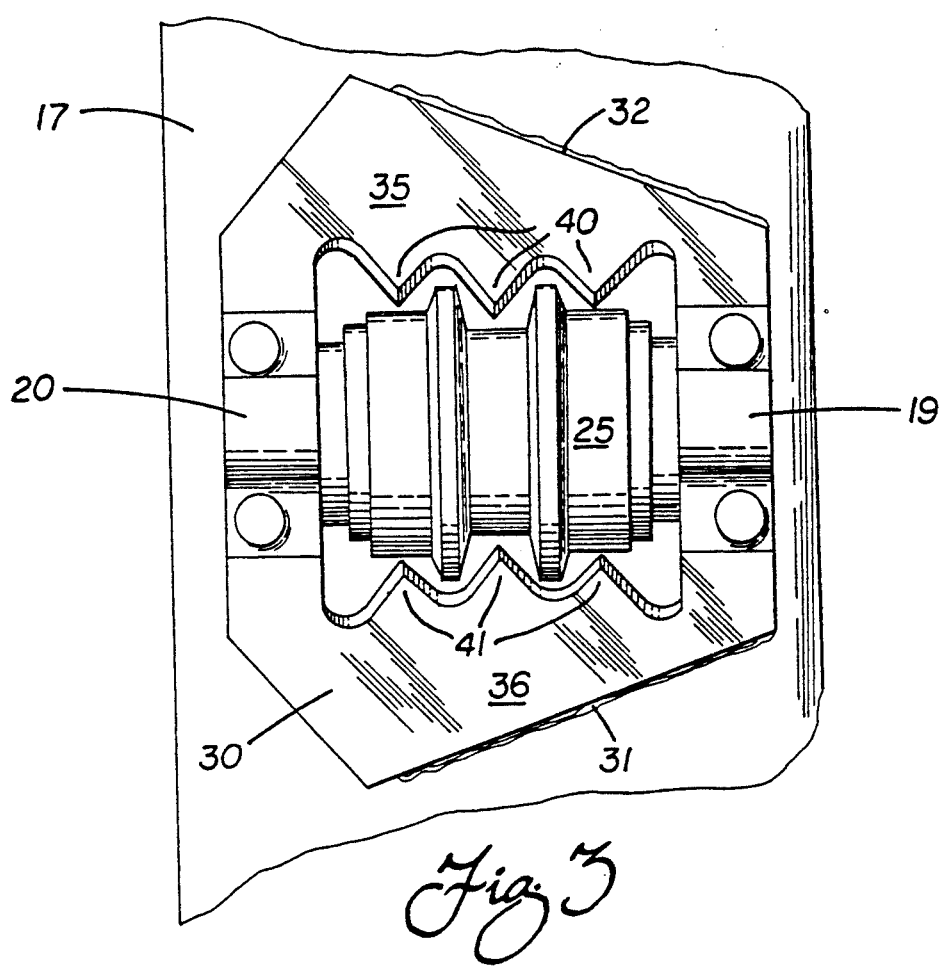
FIG. 3 is a top or plan view of the idler roller mounted in accordance with the present invention.

Reference will now be made in detail to the present preferred embodiment of the invention, an example of which is illustrated in the accompanying drawing.

DETAILED DESCRIPTION OF THE PREFERRED EMBODIMENT

With reference now to FIG. 1 of the drawings, a portion of a track vehicle 10 is illustrated and, in particular, what is shown is a vertical cross-section taken through a longitudinally extending side frame 11 and depicting an endless track supported on the vehicle 10; namely, upper track section 12 positioned along the upper run of the endless path and lower track section 13 positioned along the lower run of the path. As is conventional, there are a plurality of lower support rollers 14 (only one shown) that position and carry the vehicle 10 on the track sections 13. The pillow blocks 15, 16 of each lower support roller 14 are mounted on the base of the side frame 11.

The upper sloping section of the side frame 11 is best illustrated in FIG. 1 and, in accordance with the present invention, serves to support a bracket made in accordance with the principles of the present invention, and is generally designated by the reference numeral 18.

It will be apparent that the mounting bracket 18 positions pillow blocks 19, 20 which carry the upper support roller 25, upon which rests the upper track section 12. As the track moves in its endless path during the driving of the vehicle, the individual track sections 12 move across the outer support surface of the roller 25, causing the roller to rotate. This arrangement efficiently supports the movement of the track along the endless path.

As illustrated, the roller 25 includes spaced annular ribs 26 used to engage the depending guide portions of the track sections 12, and thus laterally guide the upper run of the track during operation.

The mounting bracket 18 comprises a fabricated metal plate 30 that is welded along weld beads 31, 32 to the sloping section 17 of the side frame 11. Originally, the plate 30 is flat and then bent into its final form, including a pair of side wings 35, 36 depending downwardly from the pillow blocks 19, 20, that serve to mount the roller 25 (see FIGS. 3 and 4, in particular).

Figure 4:
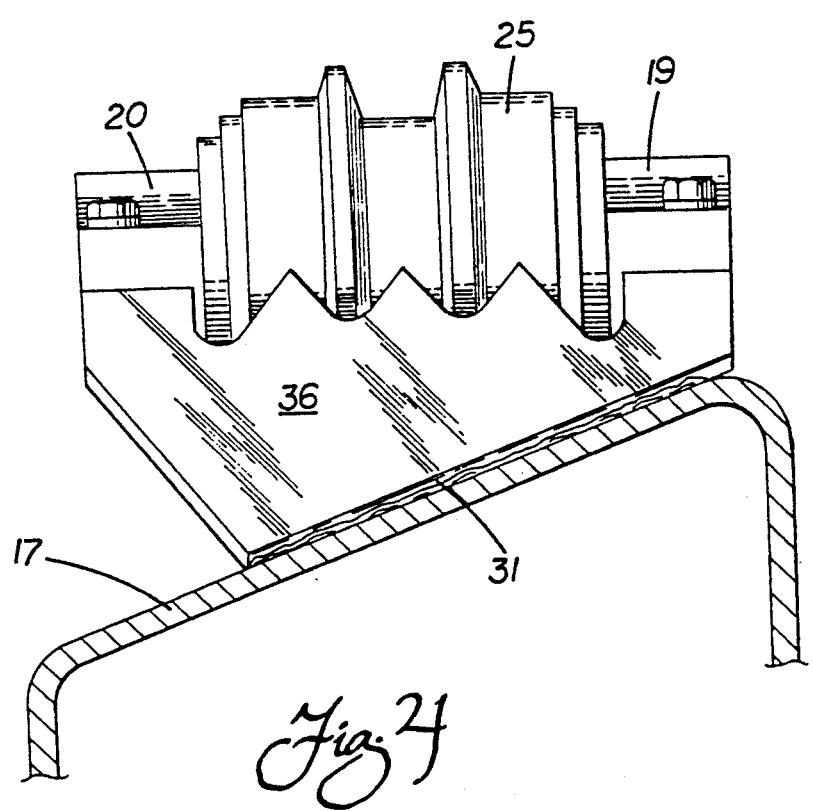
FIG. 4 is an enlarged cross-sectional view with parts broken away and removed for clarity showing the mounting bracket and the idler roller supported at both ends.

Extending upwardly from the wings 35, 36 and integral therewith are two sets of scraper teeth 40, 41, respectively. As best shown in FIGS. 3 and 4, these teeth extend into juxtaposition with the outer support surface of the roller 25, and particularly into the groove areas between the annular ribs 26. In FIG. 2, the effect of these scraper teeth 40, 41 can be seen where mud M is depicted as first being on the top of the roller, and then scraped off so as to slide down along the wing 36 of the bracket 18. Thus, as the upper track section 12 moves across the roller 25, as shown by the rotation arrow A, the mud is efficiently scraped away from the outer support surface in the desired manner (note the action arrows B). Furthermore, any residual mud or other debris left on the outer surface is scraped free by the opposite set of teeth 40, as shown by the action arrows C.

Thus, in accordance with the present invention, it can now be realized that the buildup of mud and debris around the support roller for the track section 12 of a track vehicle is prevented due to the efficient removal as the roller rotates. The bracket 18 is simple in construction, passive in operation and can be economically formed by an easy cutting and bending operation on conventional forming machines. While any suitable gauge and type of metal can be utilized, in a standard crawler-type vehicle, the plate can be a nominal three-quarter inch thick mild steel.

The span of open space under the bracket 18 within the outwardly spaced wings 35, 36 provides for easy egress of the mud and debris being scraped from the bottom of the roller 25. It can easily slide down the sloping section 17 of the side frame 11. Preferably, the wings 35, 36 extend at an angle from the horizontal of approximately 45 degrees. This places the sets of teeth 40, 41 substantially tangential to the adjacent recessed groove areas of the roller being scraped.

The bracket 18 is further novel in design in that the roller 25 actually extends down into the central opening that is cut in the bracket 18 in a fashion that the protection from outside sources is maximized, and the scraping action can be efficient, as described. The spaced pillow blocks 19, 20 are mounted on spaced bridge portions 45, 46 (note FIGS. 1 and 2). This provides very stable straddle mounting for the roller 25, which is a decided improvement over the prior art, especially in relation to the prior art cantilevered-type bracket mounting.

In summary, from the foregoing it can now be realized that the fabricated support bracket 18 for mounting of a support roller on a track vehicle provides substantial advantages in terms of efficient operation, as well as low initial cost. Because of the integral scraper defined by the two sets of teeth 40, 41, the roller 25 is left free of mud and debris, even under the most adverse circumstances. No longer can mud prevent the rotation of the roller 25 since it is cleaned automatically as the vehicle moves. As a result, flat spotting of the roller 25, as has been a problem in the past, is alleviated. The simplicity of the bracket 18 and the simple cutting and bending operation to form the bracket minimizes the cost involved. With the relative wide base mounting provided by the wings 35, 36, there is little or no chance of the bracket 18 being bent due to mud, debris or boulders that might become wedged into the area between the frame 11 and the upper track section 12. Maintenance is substantially reduced over prior arrangements.

By positioning the roller 25 down within the opening formed by the sets of teeth 40, 41 and the bridge portions 45, 46, the roller is protected during operation. The sets of teeth 40, 41 are fixed in position in close juxtaposition with the areas being scraped. Because of the pointed configuration, even dry, hardened or frozen mud can be easily scraped away without slippage between the track and the roller.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

I claim:

1. A mounting bracket for a track support roller, said bracket being connected to the frame of a vehicle comprising:
    a plate extending outwardly from said frame;
    means for mounting and supporting the roller on said plate;
    scraper means on said plate extending adjacent the roller;
    whereby mud and debris are efficiently removed from the roller as the roller rotates relative to said plate.

2. The bracket of claim 1, wherein said scraper means is integral with said plate.

3. The bracket of claim 2, wherein said scraper means further comprises a plurality of teeth formed on said plate and extending into juxtaposition with the outer support surface of said roller.

4. A mounting bracket for a track support roller, said bracket being connected to the frame of a vehicle, said roller having an outer support for the track, comprising:
    a plate extending outwardly from said frame;
    means for mounting the roller on said plate;
    scraper means on said plate extending adjacent the roller and integral with said plate;
    said scraper means further including a plurality of teeth formed on said plate and extending into juxtaposition with the outer support surface of said roller; and
    said outer support surface of said roller including a pair of raised annular ribs for lateral guiding of the track, said teeth extending between and on both sides of said ribs;
    whereby mud and debris are efficiently removed from the roller as the roller rotates relative to said plate.

5. A mounting bracket for a track support roller, said bracket being connected to the frame of a vehicle comprising:
    a plate extending outwardly from said frame;
    means for mounting the roller on said plate;
    dual depending support wings on said plate extending from said mounting means into fixed engagement with said frame, one of said wings extending on each side of said roller; and
    scraper means on said plate extending adjacent the roller;
    whereby mud and debris are efficiently removed from the roller as the roller rotates relative to said plate.

6. The bracket of claim 5, wherein said wings extend downwardly at an angle of approximately 45°, said scraper means being formed integrally along the top of said wings and substantially tangentially to the outer support surface of said roller.

7. The bracket of claim 6, wherein said plate includes a cut-out opening between said wings for receiving said roller, said mounting means being positioned at opposite ends of said rollers on said plate.

8. The bracket of claim 7, wherein said scraper means further comprises two sets of teeth formed on said plate and extending into juxtaposition with the outer support surface of said roller, said teeth being integrally formed on said plate along opposite sides of said cut-out portion.

9. The bracket of claim 8, wherein the support surface includes a pair of raised annular ribs for lateral guiding of the track, said teeth extending between and on both sides of said ribs to clear the mud/debris.

10. The bracket of claim 9, wherein said mounting means includes spaced, flat bridge portions of said plate at the ends of said roller and bearing pillow blocks on said bridge portion for supporting the ends of said roller.

11. The bracket of claim 7, wherein said roller extends down into said opening to provide primary scraping along the top of the roller by one set of teeth and secondary scraping along the bottom of the roller by the other set of teeth.

* * * * *